A. SEIDENBERG.
DRYING AND EXTRACTING APPARATUS.
APPLICATION FILED JAN. 26, 1915.

1,164,667.

Patented Dec. 21, 1915.

Witnesses
Agnes Bradley
Jacob Lauer

Inventor:
Armin Seidenberg by
Benedict S. Wise
his Atty.

COLUMBIA PLANOGRAPH CO., WASHINGTON, D. C.

UNITED STATES PATENT OFFICE.

ARMIN SEIDENBERG, OF NEW YORK, N. Y.

DRYING AND EXTRACTING APPARATUS.

1,164,667.  Specification of Letters Patent.  Patented Dec. 21, 1915.

Application filed January 26, 1915. Serial No. 4,473.

*To all whom it may concern:*

Be it known that I, ARMIN SEIDENBERG, a citizen of the United States, and a resident of the city, county, and State of New York, (whose post-office address is 25 Convent avenue, New York city, borough of Manhattan,) have invented a new and useful Improvement in Drying and Extracting Apparatus, of which the following is a specification.

The object of my invention is to provide a device of this class which may be used whenever a chemist wishes to make an analysis of milk or other similar substances so as to determine the amount of fats and other solids therein.

My invention comprises a suitable gauze, or similar substance, which is preferably corrugated and ridged, and a tray of sheet lead or similar material in which the gauze may rest, so that after the tray has been laid out flat and the gauze placed thereon and milk or other liquid added thereto, the same may be placed, while still flat, in a suitable drying oven and there dried, and then the tray and gauze may be folded together and placed in a Soxhlet apparatus for further action. Incidentally, the tray and gauze are weighed, from time to time, in the conventional manner, so as to determine the various losses, from evaporation and other causes, so that by a proper comparison the requisite proportions of fats and other solids may be accurately determined. This object is accomplished by my invention, one embodiment of which is hereinafter set forth.

For a more particular description of my invention, reference is to be had to the accompanying drawings, forming a part hereof, in which—

Figure 1:
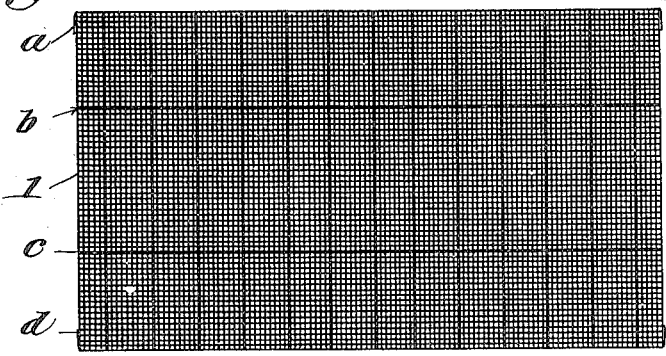
Figure 3:
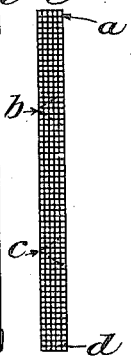
Figure 2:
Figure 4:
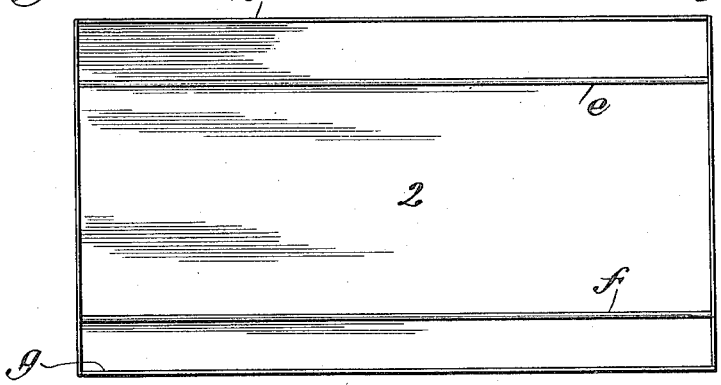
Figure 6:
Figure 5:
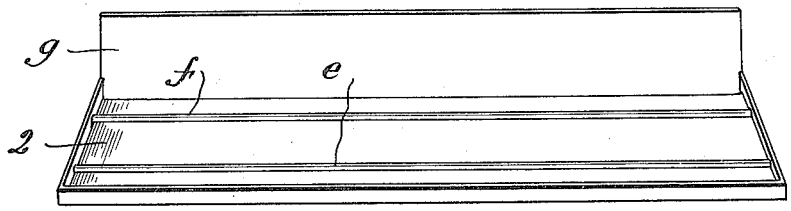

Figure 1 is a plan view of a gauze embodying a portion of my invention. Fig. 2 is a side elevation of the same. Fig. 3 is an end elevation of the same when stood on end. Fig. 4 is a plan view of the tray. Fig. 5 is a side elevation of the same. Fig. 6 is an end elevation, stood on end.

Throughout the various views of the drawings, similar reference characters designate similar parts.

The gauze used in my improved apparatus is preferably fine wire gauze made out of brass or copper wire or wire made out of any suitable material and duly burned or heated in a flame. This gauze 1 is also corrugated transversely and has its edges folded over as shown at $a$ and $d$, and is preferably provided with two or more longitudinal corrugations $b$ and $c$ which prevent, or tend to prevent, any flow of the liquid in the direction of the corrugations.

The tray 2 is preferably made of sheet lead with upturned sides $g$ and $h$, and longitudinal ribs $e$ and $f$ which do not coincide with the longitudinal corrugations $b$ and $c$, so that when the wire gauze above described is placed in the tray the gauze will not rest on the bottom of the tray.

It will be noted that the edge $g$ is preferably extended considerably beyond the edge $h$ so as to allow ample room for folding over the gauze prior to rolling.

My improved tray and gauze are used as follows: Assuming the gauze to have been prepared, as above described, it is placed on a tray and rests on the ribs $e$ and $f$ and off the bottom so that no liquid will be drawn through the mesh by capillary action. The milk or other fluid to be analyzed is then placed on the gauze in the various corrugations in small quantities so as not to have any tendency to run, either along or through the gauze, the gauze to hold the liquid, and then the tray and gauze are placed together in a drying oven and the liquid or the fluid is evaporated while the fats and other solids remain. It will be understood that the gauze and tray are weighed when empty, they are weighed after a predetermined quantity of liquid is placed thereon, and they are again weighed when the liquid or the fluid has been dried off, as above described. The solids then cling to the gauze and the gauze is rolled in the lead into a compact roll and placed in the Soxhlet apparatus where fresh ether attacks the gauze in the conventional way and takes from it all the soluble solids which, in the case of milk, are the fats, but not the others. When these fat solids have all been extracted the gauze is removed and weighed and its loss of weight shows the weight of the fats removed. This can be checked up by evaporating the ether and checking the fats so recovered so that an exact determination may be made of the percentage of solids and fats in the milk or other fluid in question.

It will be apparent from the foregoing that my apparatus is efficient and enables the operator to make analyses with ease and with uniform accuracy.

While I have shown and described one embodiment of my invention, it is obvious that it is not restricted thereto, but is broad enough to cover all structures that come within the scope of the annexed claims.

Having thus described my invention, what I claim is—

1. In a drying and extracting apparatus described, a corrugated and perforated metallic sheet adapted to receive and hold a liquid and a ribbed tray adapted to hold said sheet and be rolled with the same.

2. In a drying and extracting apparatus described, a perforated metallic sheet adapted to receive and hold a liquid, and a tray adapted to be wrapped about the same.

3. In a drying and extracting apparatus described, a wire sheet adapted to receive and hold a liquid and a sheet metal tray adapted to be wrapped about the same.

4. In a drying and extracting apparatus described, a corrugated and perforated wire sheet adapted to hold a liquid and a metallic tray adapted to be wrapped about the same.

5. In a drying and extracting apparatus described, a ribbed and corrugated wire sheet adapted to hold a liquid and a metallic tray adapted to be wrapped about the same.

6. In a drying and extracting apparatus, a perforated and non-absorbent sheet adapted to receive and hold a liquid and a sheet metal tray adapted to be wrapped about the same.

ARMIN SEIDENBERG.

Witnesses:
 DAVID F. RICHTER,
 KARL KUHNLE.

Copies of this patent may be obtained for five cents each, by addressing the "Commissioner of Patents, Washington, D. C."